United States Patent [19]
Golightly et al.

[11] Patent Number: 6,077,469
[45] Date of Patent: *Jun. 20, 2000

[54] SYSTEM AND METHOD FOR APPLYING A BLADDER RELEASE BETWEEN A GREEN TIRE AND A BLADDER IN A TIRE MOLDING MACHINE

[75] Inventors: Ralph Wayne Golightly, Gadsden, Ala.; Michael Scott Coyne, Danville, Va.; Stanley Albert Crisp, Lillington, N.C.; James Elmo Newman, Ringgold, Va.

[73] Assignee: The Goodyear Tire & Rubber Company, Akron, Ohio

[ * ] Notice: This patent is subject to a terminal disclaimer.

[21] Appl. No.: 09/180,315

[22] PCT Filed: Jun. 6, 1996

[86] PCT No.: PCT/US96/09219

§ 371 Date: Nov. 4, 1998

§ 102(e) Date: Nov. 4, 1998

[87] PCT Pub. No.: WO97/46360

PCT Pub. Date: Dec. 11, 1997

Related U.S. Application Data

[63] Continuation-in-part of application No. 08/369,748, Jan. 6, 1995, Pat. No. 5,556,588.

[51] Int. Cl.[7] ............................ B29C 33/58; B29C 35/02

[52] U.S. Cl. .......................... 264/130; 264/315; 264/326; 425/38; 425/96

[58] Field of Search ............................ 425/28.1, 35, 38, 425/43, 52, 90, 96, 98, 102, 103, 107; 264/130, 315, 326

[56] References Cited

U.S. PATENT DOCUMENTS

| | | |
|---|---|---|
| 3,640,653 | 2/1972 | Laenen et al. . |
| 4,329,265 | 5/1982 | Hallenbeck . |
| 4,778,060 | 10/1988 | Wessner, Jr. . |
| 5,205,378 | 4/1993 | Boelkins . |

FOREIGN PATENT DOCUMENTS

| | | |
|---|---|---|
| 0160537 | 11/1985 | European Pat. Off. . |
| 0385919 | 9/1990 | European Pat. Off. . |
| A04-083633 | 3/1992 | Japan . |

*Primary Examiner*—James P. Mackey
*Attorney, Agent, or Firm*—Howard M Cohn

[57] ABSTRACT

Apparatus and methods for automatically spraying a mist of mold release into the confined space between a tire and an inflatable bladder in a tire molding machine so that the mold release covers the outer surface of the inflatable bladder and/or the interior surface of the tire and does not get onto the walls of the mold. In addition, bladder release is presprayed onto the interior surface of the green tire prior to posititoning the green tire within the tire mold.

20 Claims, 13 Drawing Sheets

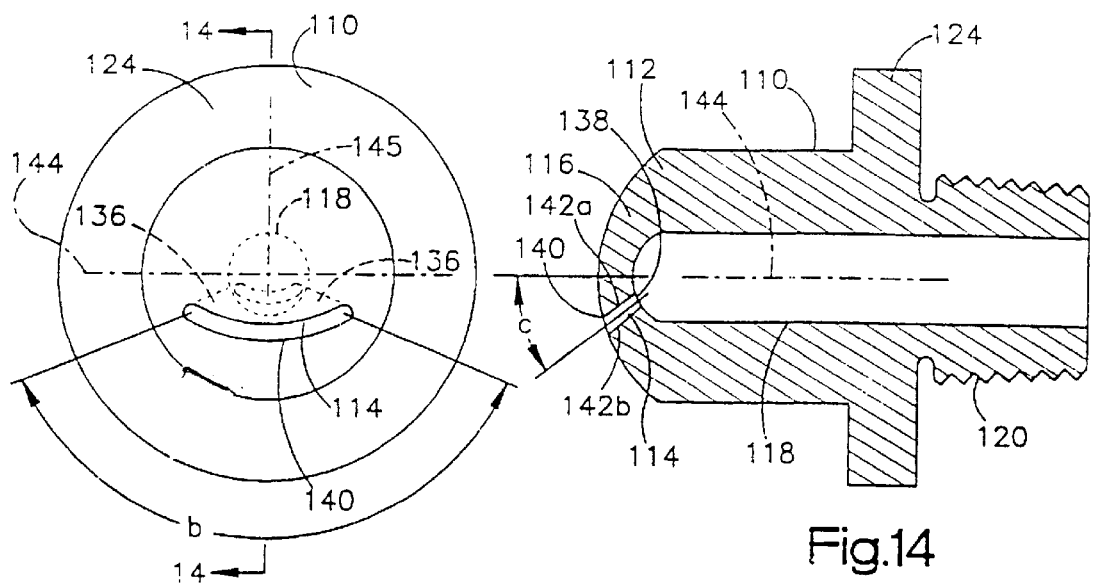
Fig.13
Fig.14
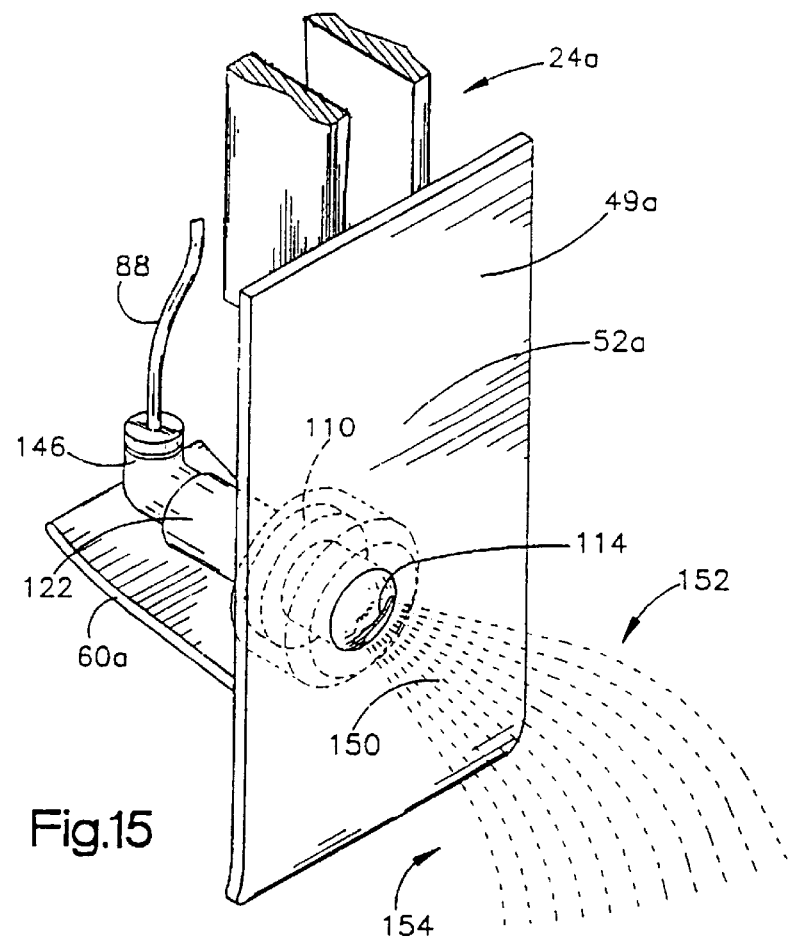
Fig.15

SYSTEM AND METHOD FOR APPLYING A BLADDER RELEASE BETWEEN A GREEN TIRE AND A BLADDER IN A TIRE MOLDING MACHINE

RELATED APPLICATIONS

This is an application for a continuation-in-part application of pending prior application Ser. No. 08/369,748 filed on Jan. 6, 1995 of Mike Scott Coyne et al., now U.S. Pat. No. 5,556,588, entitled A SYSTEM AND METHOD FOR APPLYING BLADDER RELEASE BETWEEN A GREEN TIRE AND A BLADDER IN A TIRE MOLDING MACHINE.

FIELD OF THE INVENTION

This invention relates to the field of tire manufacture and more particularly, the invention relates to a system and method for pre-spraying a bladder release a green tire onto the interior surface of a tire and then applying a bladder release between a green tire and an inflatable bladder in a tire molding machine.

In the manufacture of tires, typically used for automobiles and trucks, a green tire (one which is already formed but not cured) is placed in an open mold within a conventional tire pressure molding machine. The tire is positioned about a deflated inflatable bladder disposed within the mold section of the molding machine. After, the tire mold is closed and sealed, the inflatable bladder is inflated to force the green tire against the heated mold walls whereby the tire is formed with a tread pattern. After some period of time, the tire is cured, the inflatable bladder is deflated, the mold is opened, and the now cured tire ejected from the mold. In the past, the inflatable bladder sometimes stuck to the tire after the molding operation was completed and the inflatable bladder was deflated. Then, a machine operator would have to manually separate the inflatable bladder from the interior wall of the tire before the completed tire could be ejected and a new green Lire inserted. This caused a costly, time consuming delay in the manufacturing process.

To overcome this problem, a machine operator would often spray a coating of bladder release to either the inside surface of the green tire and/or the inflatable bladder with a paint gun prior to loading the green tire within the pressure molding machine and inflating the inflatable bladder. While this technique was effective to insure that the inflatable bladder would separate from the cured tire when the molding process was completed, it was still time consuming because it required the machine operator to individually spray each tire or inflatable bladder before the green tire was loaded into the molding machine. Further, the machine operator had to carefully apply the bladder release to ensure that the bladder release completely covered the interface surface between the tire and the inflatable bladder so that the inflatable bladder wouldn't stick to a section of tire. Besides being a costly, time consuming process, which could possibly slow the production of tires, it was also subject to operator error. These errors include not every tire being sprayed, inconsistencies in application of the bladder release causing the inflatable bladder to stick against uncoated sections of the tire, and overspray of the bladder release. Oversprayed bladder release typically resulted from the pressure of the bladder release being sprayed on the inflatable bladder. The excess bladder release often got into the mold and contaminated the mold walls, especially because of the tendency for dirt to cling to the viscous bladder release. This contamination often necessitated stoppage of the tire production line to clean the molds, another time consuming, and costly delay. Furthermore, the system was not adaptable to modern manufacturing techniques where the entire process is handled by machines and robots.

It became apparent that an apparatus and method of operating the apparatus was needed to prevent the sticking of the inflatable bladder to the inside walls of cured tires without the attention of a machine operator arid the time delays and costs associated therewith.

It is an object of the present invention to provide a system and method for applying a bladder release between a green tire and an inflatable bladder in a tire molding machine which obviate the problems and limitations of the prior art systems.

It is a further object of the present invention to provide an improved system and method for applying a mist or spray of bladder release between a green tire and an inflatable bladder in a tire molding machine after the green tire has already been loaded within the tire molding machine.

It is a still further object of the present invention to provide an improved system and method for spraying a mist of bladder release between a green tire and an inflatable bladder in a tire molding machine so that the bladder release does not get onto the interior walls of the mold portion of the tire molding machine.

Yet another object of the present invention to provide an improved system and method for automatically applying a bladder release to both a green tire and an inflatable bladder in a tire molding machine without the use of a machine operator.

Still another object of the present invention to provide an improved system and method for pre-spraying the interior surface of the green tire with bladder release and subsequently spraying the bladder release to both a green tire and an inflatable bladder in the mold of the tire molding machine without the use of a machine operator.

According to the invention, a tire molding machine for curing a green tire includes a tire mold having an inflatable bladder therein for pressing the green tire against the sides of the tire mold. The molding machine includes a tire loader having a plurality of tire loading paddles for picking up and loading the green tire into the tire mold about the inflatable bladder. A lubricating system is mounted on at least one and typically each of a plurality of tire loading paddles. The lubricating system sprays a mist of the bladder release into the space formed between the tire and the inflatable bladder.

According to the invention, the lubricating system includes a bladder release supply mounted to the tire loader, a plurality of bladder release feed tubes secured to each of the plurality of tire loading paddles, and a nozzle extending through each of the plurality of tire loading paddles for spraying the mist of bladder release between the green tire and the inflatable bladder. Preferably, the nozzles spray the bladder release directly towards the inflatable bladder or tire.

Also according to the invention, the method of curing a green tire in a tire molding machine comprises the steps of: picking up a green tire with tire loading paddles; lowering the green tire with the tire loading paddles about an inflatable bladder disposed within the tire mold of the tire molding machine; spraying a mist or cloud of mold or bladder release into the space between the tire and the inflatable bladder; releasing the green tire within the tire mold from the plurality of tire loading paddles; and raising the tire loading paddles.

The method of the invention also includes spraying a mist of the bladder release from each of the plurality of tire loading paddles directly against either the inner surface of the green tire or the inflatable bladder.

An alternative method of the invention includes both pre-spraying a mist of the bladder release from each of the plurality of tire loading paddles directly against the inner surface of the green tire before the tire is loaded into the mold. Subsequent to the pre-spraying, a mist of the bladder release is sprayed from each of the plurality of tire loading paddles into the confined space between the inner surface of the green tire and the inflatable bladder when the tire is loaded within the mold to cover both the interior surface of the tire as well as the inflatable bladder.

The structure, operation, and advantages of the presently preferred embodiments of the invention will become further apparent upon consideration of the following description taken in conjunction with the accompanying drawings, wherein:

BRIEF DESCRIPTION OF THE DRAWING

FIG. 13 is an enlarged front detail view of the orifice of the nozzle of the embodiment of FIG. 11;

FIG. 14 is a view through line 14—14 of FIG. 13 showing a side cross-sectional view of the nozzle of the alternative embodiment of FIG. 11;

FIG. 15 is a perspective view of the tire loading paddle of FIG. 11, illustrating the spray pattern of the nozzle of the alternative embodiment.

DETAILED DESCRIPTION OF THE INVENTION

Figure 1:
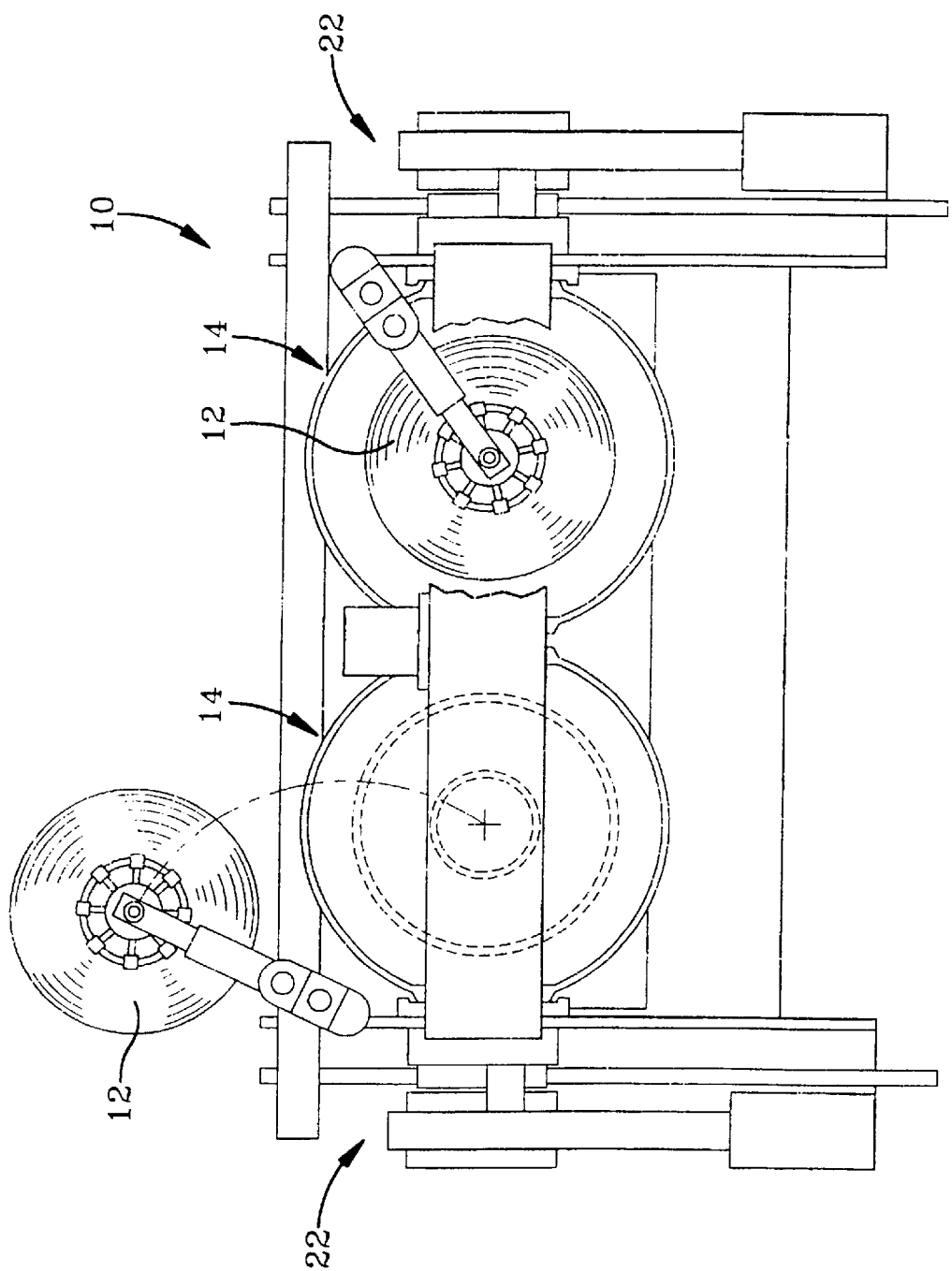
FIG. 1 is a plan view of a tire molding machine, in accordance with the invention.
Figure 2:
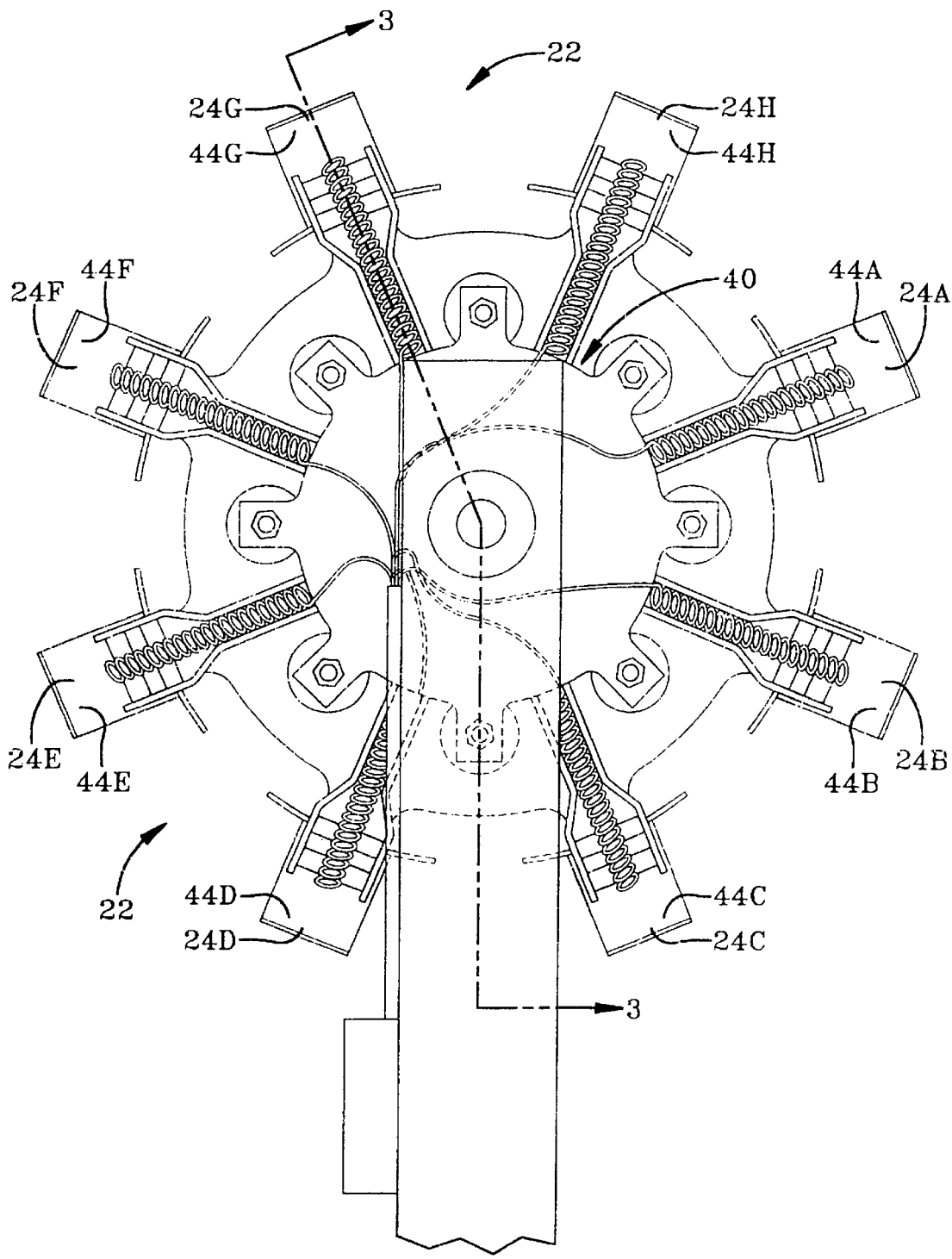
FIG. 2 is a plan view of the tire loader of a tire molding machine, as shown in FIG. 1, having eight tire loading paddles.
Figure 6:
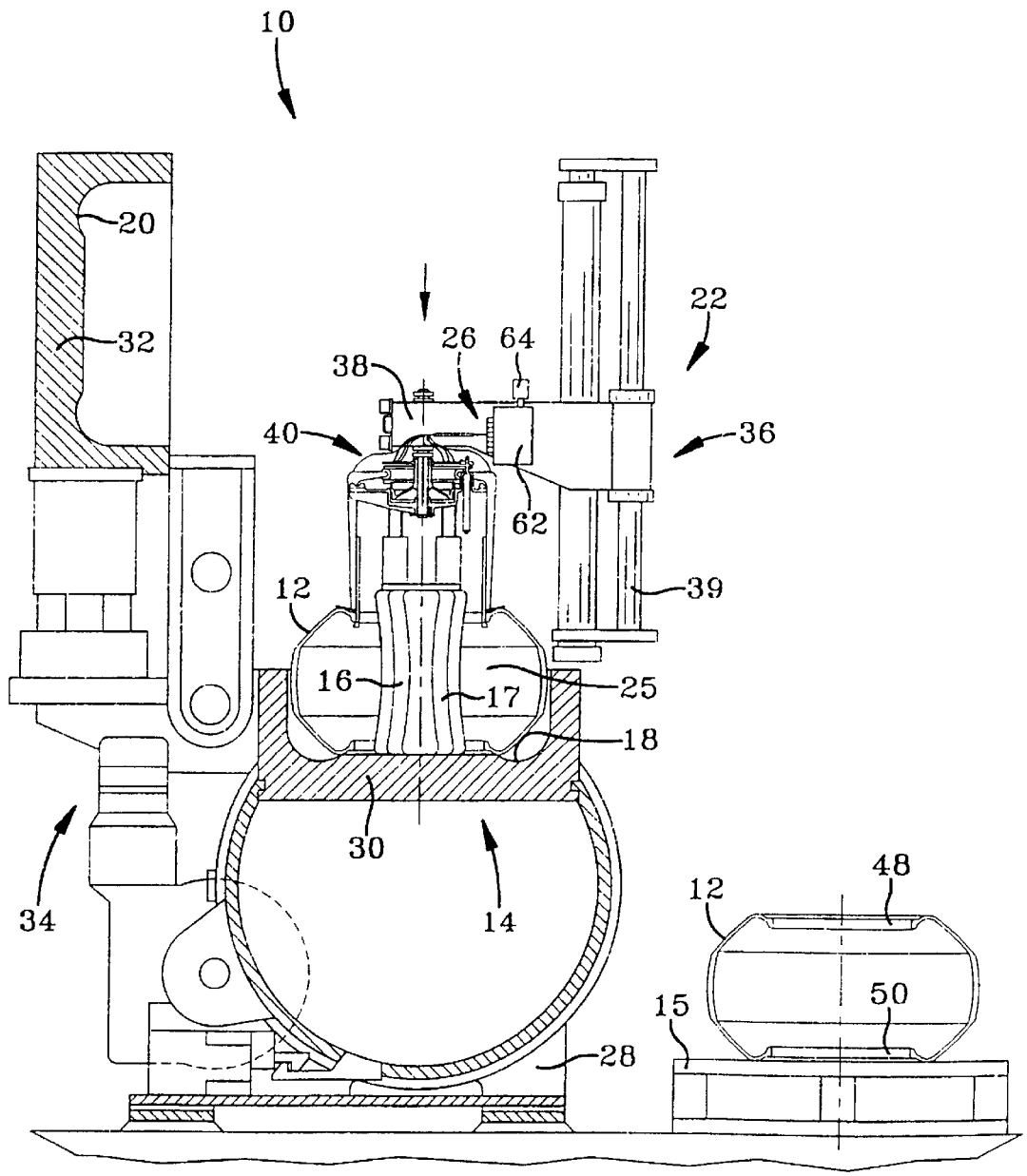
FIG. 6 is a side elevational view, partly in cross section, illustrating the tire molding machine of FIG. 1, with the green tire on a tire loader positioned on the inflatable bladder after being loaded into the mold.
Figure 7:
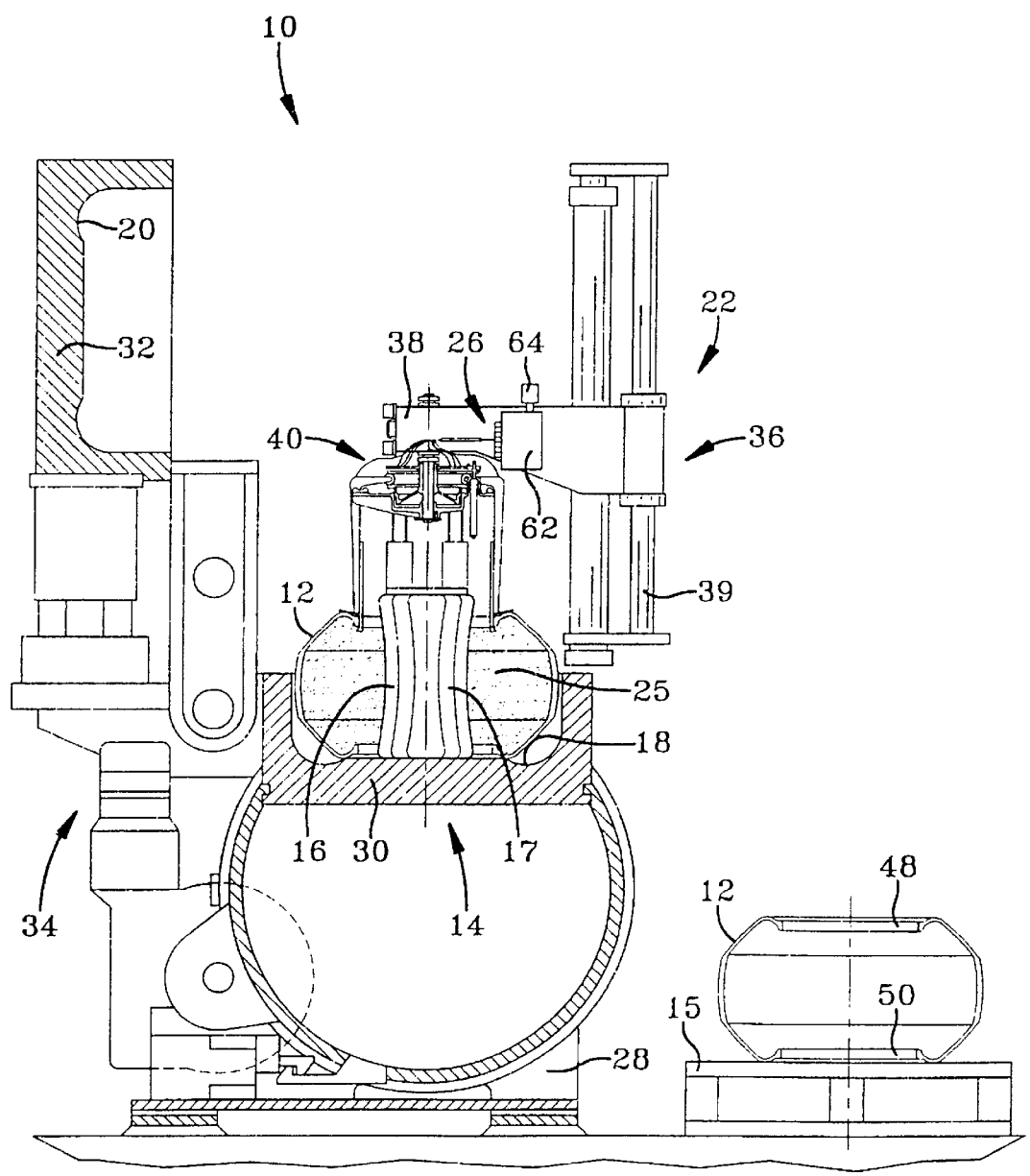
FIG. 7 is a side elevational view, partly in cross section, illustrating the tire molding machine of FIG. 1, after a mist of bladder release is sprayed into the confined space between the green tire and the inflatable bladder.
Figure 9:
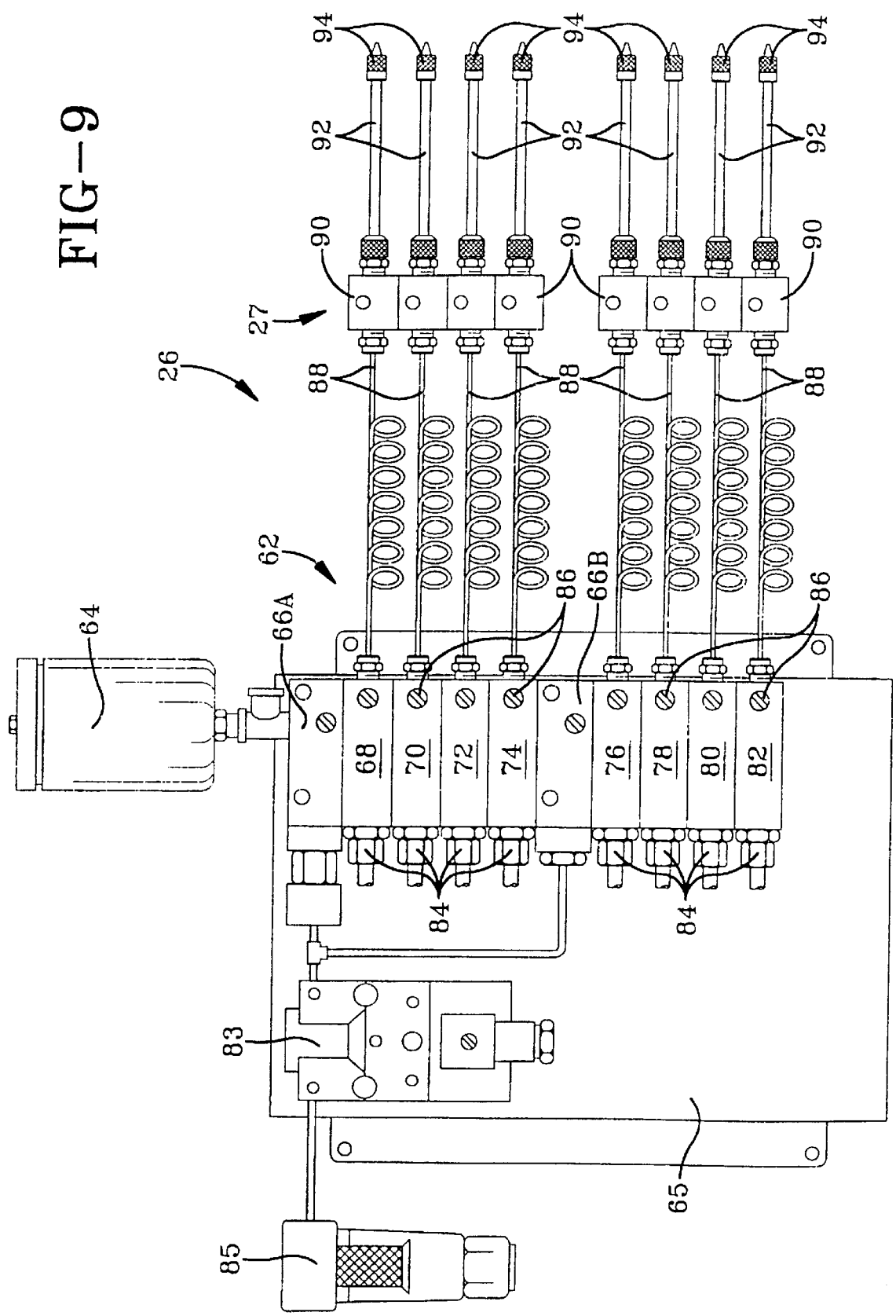
FIG. 9 shows an enlarged view of the lubrication system of the present invention.

Referring to FIGS. 1 and 4–7, a tire molding machine 10 is shown for curing a green tire 12 within a tire mold 14 having an inflatable bladder 16 for pressing green tire 12 against the inwardly facing surfaces 18 and 20 of tire mold 14. A tire loader 22, as shown in FIG. 2, includes a plurality of tire loading paddles 24A, 24B, 24C, 24D, 24E, 24G, 24H (24A–24H) for picking up a green tire 12 from a storage station, such as a platform 15, and loading it into tire mold 14. A lubricating system 26 is mounted on tire loader 22 and preferably has a lubrication delivery section 27, as shown in FIG. 9, secured to each of the plurality of tire loading paddles or support arms 24A–24H for applying a bladder release or lubricant in the enclosed space 25 between green tire 12 and inflatable bladder 16, as shown in FIGS. 6 and 7.

As shown in FIGS. 4–7, tire molding machine 10 has a base support 28 onto which is secured tire mold 14. Mold 11 has a bottom section 30 and a top section 32 shown in its upright, open position. A mechanism 34 for opening and closing mold 14 is schematically illustrated. Mechanism 34 operates by pivoting closed the top section 32 and lowering it against the bottom section 30 where it is sealed in place. Alternatively, mechanism 34 raises top section 32 away from bottom section 30 and then pivots the former open to a position as shown in FIGS. 4–7, Since the opening and closing of mold 14 is not an important aspect of the present invention, mechanism 34 is shown schematically and not described in detail herein.

An inflatable bladder 16 having an outwardly facing surface 17 is mounted within mold 14 and preferably secured to bottom section 30. The inflatable bladder 16 can be inflated with air from a supply (not shown) and deflated as required. The inflatable bladder 16 is typically constructed of rubber or an elastomer.

Figure 3:
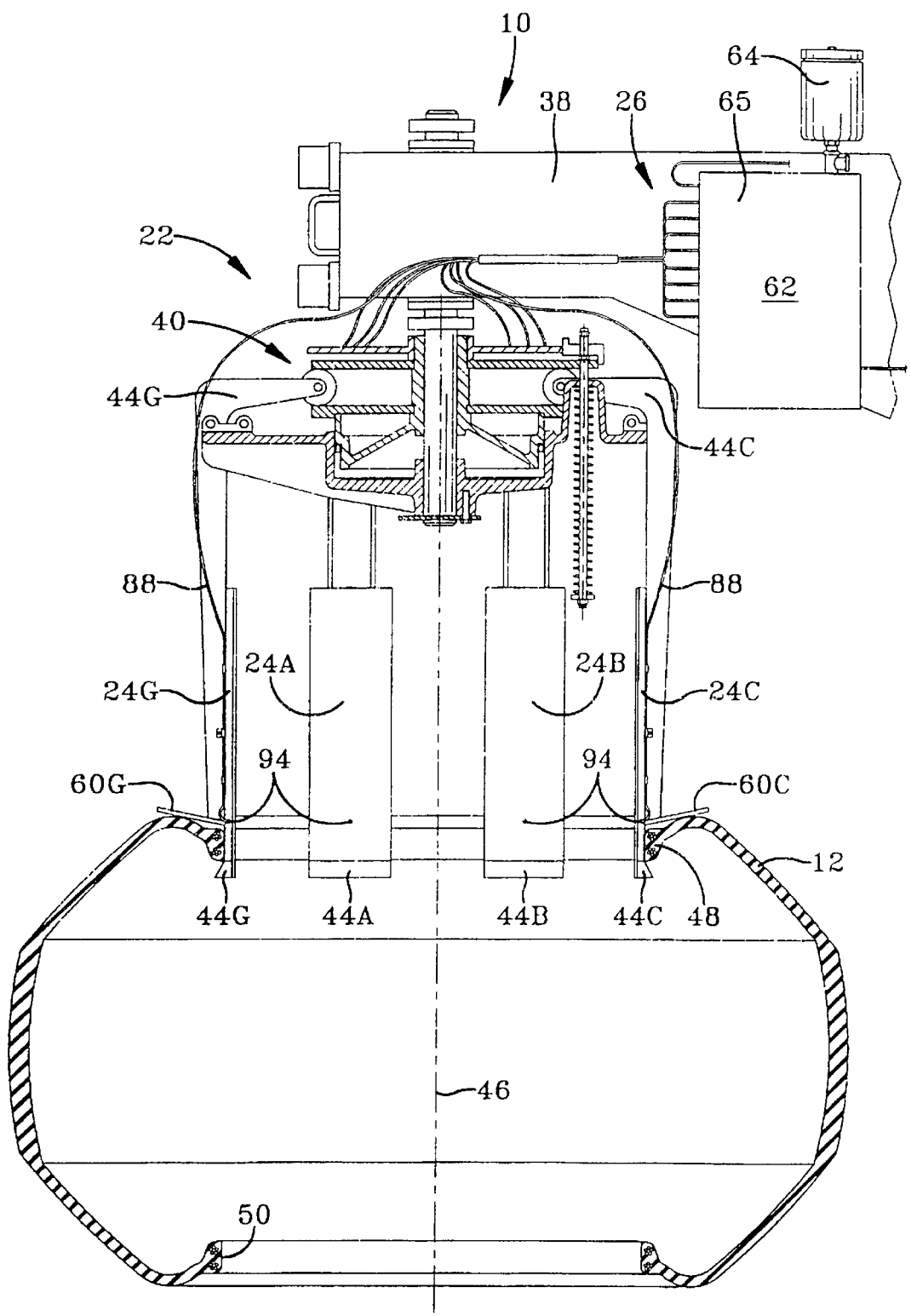
FIG. 3 is a side elevational view, partly in cross section, through line 3—3 of FIG. 2 showing tire loading paddles of the tire loader gripping a green tire.

Tire loader 22 includes an upright support 36 which is secured at its lower end to the base support 28. Support 36 includes a movable support structure 38 which both moves up and down and pivots about a rod 39. The tire loading paddles 24A–24H are secured at their upper end sections 42A,42B,42C,42D,42E,42F,42G,42H (42A–42H) to a support arm operator 40 which in turn is mounted to movable support structure 38. The upper end sections 42A–42H of support arms 24A–24H, as shown in FIG. 3, are pivotally mounted to support arm operator 40 so that the lower end sections 44A,44B,44C,44D,44E,44F,44G,44H (44A–44H) of support arms 24A–24H move both radially outward and inward toward a centerline 46 extending through the tire loader 22. When the lower end sections 44A–44H are closest to centerline 46, the effective diameter of a circle formed about the outwardly facing surface of the lower end sections 44A–44H of tire loading paddles 24A–24H is smaller than the diameter of the openings 48 and 50 formed on either side of the tire 12 so that lower end sections 44A–44H can be easily inserted and/or removed from the opening 48 of tire 12. Conversely, when the lower end sections 44A–44H are moved outward from centerline 46, until the effective diameter of a circle formed about the outwardly facing surfaces of the lower end sections 44A–44H of tire loading paddles 24A–24H is larger than the diameter of the openings 48 and 50 formed on either side of tire 12, the lower end sections 44A–44H then press against the circular surface forming the opening 48 to securely grip tire 12 so that the tire can be picked up and loaded into mold 14 as necessary.

Figure 8:
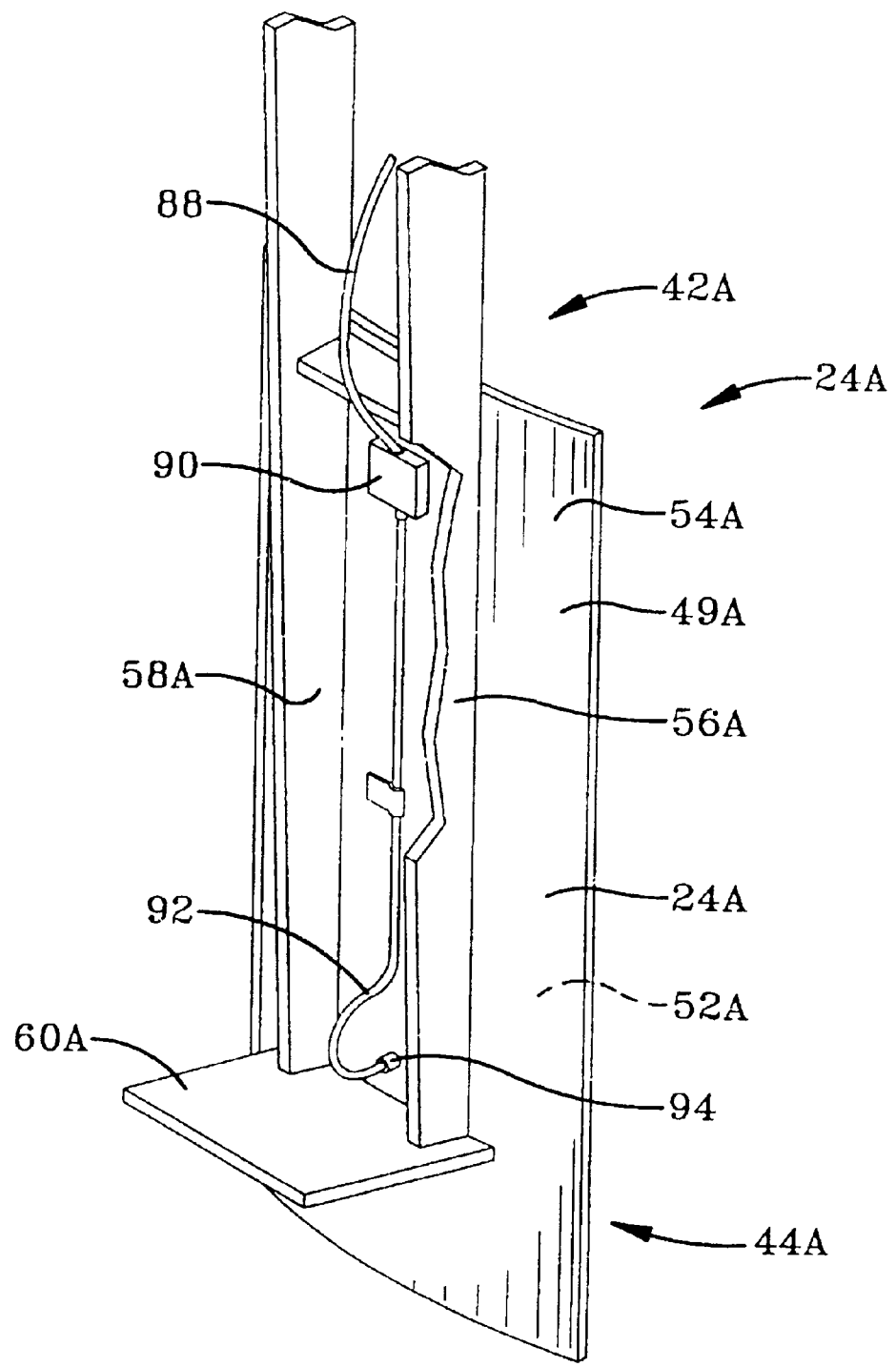
FIG. 8 shows an enlarged view of a tire loading paddle of the loading machine incorporating a feed line and nozzle of the lubrication system of the present invention.

Referring to FIG. 8, a detailed illustration of a tire loading paddle 24A is provided. Since all of the tire loading paddles 24A–24H are substantially identical, only a description of tire loading paddle 24A is included herein. Tire loading paddle 24A has a curved, elongated plate section 49A with an inwardly facing curved surface 52A that faces centerline 46 and an outwardly facing curved surface 54A mounted onto two elongated plates 56A and 58A. The upper ends of plates 56A and 58A form upper end section 42A and are pivotally secured to support arm operator 40. The lower ends of plates 56A and 58A are secured in abutting relationship to a stop plate 60A which extends substantially perpendicularly outward from the outwardly facing curved surface 54A of plate section 49A.

During typical operation, tire loading paddles 24A–24H are moved downward and inserted into the opening 48 of tire 12 until the stop plates 60A–60H are abutted against the side wall of tire 12. Then, the upper end sections 42A–42H of loading arms 12A–12H are pivoted outward and away from centerline 46, until the lower end sections 44A–44H of the elongated plate sections, such as end sections 44A,44B,44C, and 44G, shown in FIG. 3, frictionally engage the surface forming the opening 48 of green tire 12 to securely grip the tire and enable it to be raised or lowered as it is loaded or removed from mold 14.

A principle feature of this invention is the provision of a lubricating system 26 which includes a fluid dispenser 62, such as a UNI-MAX nozzle unit by UNI-MIST of Grand Rapids, Mich., or an Accu-lube by ITW Fluid Products Group of Norcross, Ga., as shown in FIG. 9. Fluid dispenser 62 includes an enclosure 65 containing eight separate pump units 68,70,72,74,76,78,80,82 (68–82) stacked on one another. Enclosure 65 is shown in FIG. 3 mounted on movable support structure 38 of tire loading 22. It is however, within the terms of the invention to mount dispenser 62 at some other location on or even adjacent the tire machine 10. Fluid dispenser 62 includes a reservoir 64 of liquid bladder release and has two air pulse generators 66A,66B actuated by a solenoid valve 83 drawing air through an air filter 85. The air pulse generators 66A,66B determine the stroke rate of the pump units 68–82. Air is added immediately downstream of the pump units 68–82. The resultant output stream of air is added to the liquid bladder release from reservoir 64 to atomize the bladder release being pumped from the eight pump units 68–82. Eight injector-liquid adjustment knobs 84, one for each nozzle unit 68–82, independently adjusts the liquid output and air metering screws 86 control the flow of air. Flexible capillary tubes 88 are connected at one end to individual pump units 68–82 and at the other end to individual couplings 90, which in turn are secured to each of the tire loading paddles 24A–24H. For each of the tire loading paddles 24A–24H, a delivery tube 92, is attached at one end to coupling 90 and at the other end to a nozzle 94. The nozzles 94 are individually mounted in a throughhole which extends through the lower ends 44A–44H of plate sections 48A–48H of tire loading paddles 24A–24H, such as adjacent the intersection of plate section 48A with stop plate 60A. Preferably, the nozzles 94 are positioned so that the spray of mold release is emitted at a downward directed angle, with respect to the inner surface of each plate section 48A–48H.

In operation, the movable support structure 38 initially moves downward along rod 39 with the tire loading paddles 24A–24H in a contracted position so that the lower ends 44A–44H can enter opening 48 of tire 12 resting on surface 15 until the stop plates 60A–60H engage the upward facing side surface of the tire. Then, the upper end sections 42A–42H are pivoted outward causing the radial distance of tire loading paddles 24A–24H from centerline 46 to increase, which causes the lower end sections 44A–44H to frictionally engage the surface of opening 48 of the tire 12. Next, the movable support structure 38 returns upward along rod 39 into the position shown in FIG. 4. Support structure 38 then rotates about rod 39 so that tire 12 is positioned above the bottom section 30 of mold 14 with the lower opening 50 through tire 12 directly above the collapsed, inflatable bladder 16. Next, support structure 38 begins to move downward so that the stop plates press against the upward facing wall of tire 12 and seat the bead formed about the tire opening 50 against the bottom section 30 of mold 14. Simultaneously with or shortly before the latter step, the lubricating system 26 is activated and a mist of mold or bladder release is sprayed front each nozzle 94 against the outer facing surface 17 of the collapsed inflatable bladder 16. Typically, the confined space 25 between the inner surface of tire 12 and the outer surface 17 of inflatable bladder 16 is filled with the mist of mold or bladder release. As top section 32 begins to rotate and close against the bottom section 30 of mold 14, the tire loading paddles 24A–24H begin to retract towards the centerline 46 and move upward and away from the inner surface 18 of the bottom mold section 30. The support structure 38 continues to move upward until the tire loading paddles 24A–24H are free from opening 48 and above inflatable bladder 16 so that the top section 32 of mold 14 can close and seal mold 14 for the curing process.

An important aspect of the invention is that nozzles 94 are directed towards the collapsed inflatable bladder 16 so that the spray effectively covers the entire surface 17 of the inflatable bladder. It is, however, within the scope of the invention to direct the spray away from the inflatable bladder 16 so that the bladder release has more of a tendency to fill the enclosed space 25 between the inflatable bladder 16 and the inner surface of the tire. Another advantage of the invention is that the bladder release is sprayed after the tire 12 is placed on the inflatable bladder 16. This reduces the possibility of the bladder release being able to escape from the enclosed space 25 between the inflatable bladder 16 and the interior surface of the tire and onto the interior surface of the mold which tends to contaminate the mold and require more frequent cleaning. After the top section 32 of mold 14 is secured and sealed onto the bottom section 30 of mold 14, the inflatable bladder 16 is inflated to force the green tire 12 against the interior mold wails 18,20. After a specified amount of time required to cure the tire, the inflatable bladder 16 is deflated and the mold 14 is opened. Finally, the cured tire is ejected and the process begins again.

Figure 10:
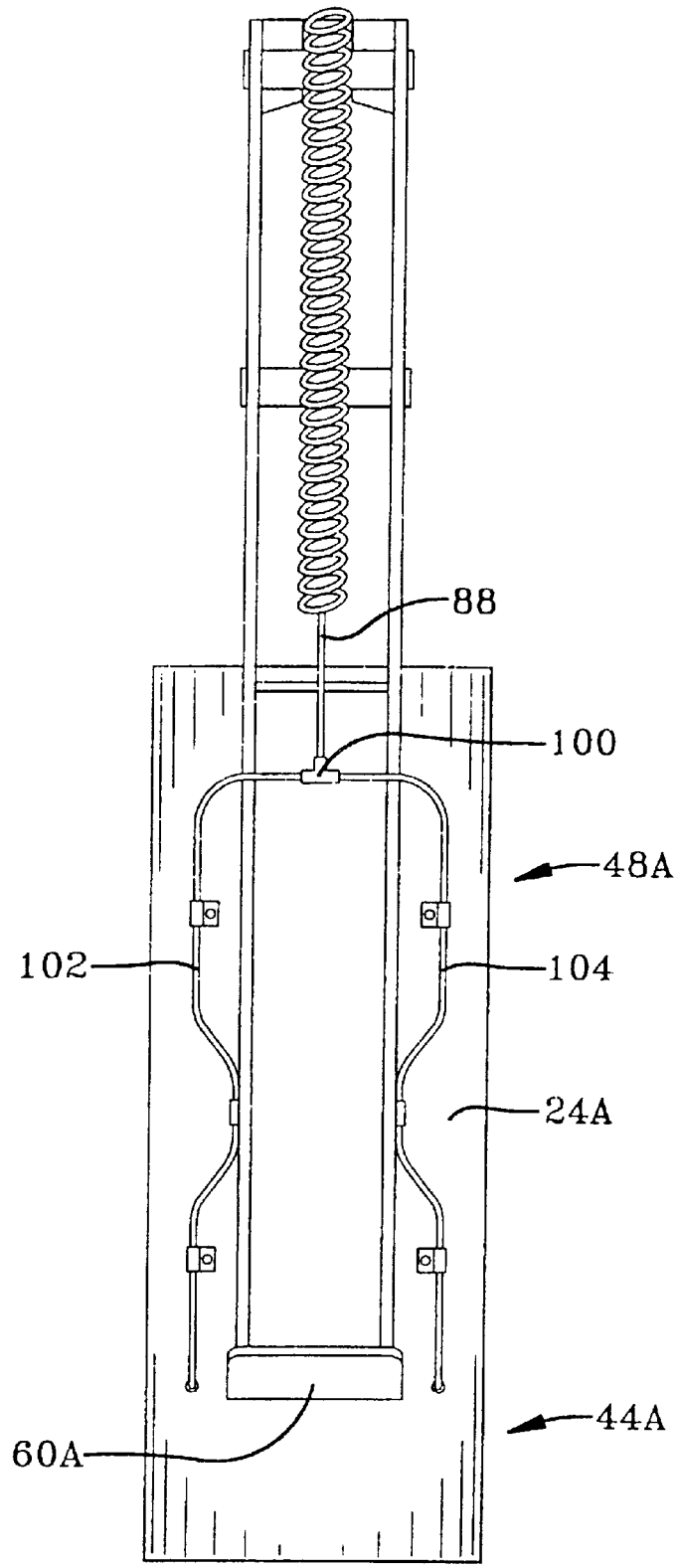
FIG. 10 is an enlarged view of a tire loading paddle of the tire loader incorporating an alternative embodiment of the lubrication system.

Referring to FIG. 10, there is illustrated an example of an alternative embodiment of the invention where two nozzles 94 are mounted in throughholes which extend through the lower end 44A of plate section 48A of tire loading paddles 24A. While only tire loading paddle 24A is illustrated, it is within the scope of the invention to mount two nozzles 94 in throughholes which extend through two or more, and preferably all of the lower ends 44A–44H of plate section 48A–48H of tire loading paddles 24A–24H to better insure an even distribution of the bladder release spray in the enclosed space 25 between the inflatable bladder and the green tire. Preferably, each of the throughholes is disposed between the longitudinal edges of the plate section and the sides of the stop plates 60A–60H. The nozzles 94 are preferably positioned, in the manner described with respect to the first embodiment so that the spray is emitted at a downward directed angle, with respect to the inner surface of the plate section 48A–48H.

The lubricating system 26 of the embodiment shown is essentially identical to that shown in FIG. 9 up to the flexible capillary tubes 88 which are connected at one end to individual pump units 68–82, as shown in FIG. 9. However, the other end of capillary tubes 88 are connected to a coupling 100, which in turn is secured to the tire loading paddles 24A–24H. Two delivery tubes 102 and 104, are each attached at one end to coupling 90 and at the other end to a nozzle 94. The nozzles 94 are secured in throughholes which extend through the plate section so that the spray of bladder release is emitted as previously discussed.

Referring to FIGS. 11–15, an alternative embodiment of the invention includes a nozzle 110 which is a divergent spray cone nozzle. Since all of the nozzle and lubricating system arrangements, one mounted on each of the tire loading paddles 24A–24H, are substantially identical, only a description of the arrangement of tire loading paddle 24A is included herein. However, it is within the scope of the invention to replace all of the nozzles 94 in the first embodiment of the invention described before with the nozzle 110. The nozzle 110 has a closed outlet end 112 with an orifice 114 which extends through a front wall 116 to a bore 118 which opens at a rear inlet end 120. Preferably, the rear inlet end 120 is threaded for attachment to a pressure valve 122, as described below. A cylindrical collar 124 is disposed intermediate the inlet and outlet ends 120 and 112. The nozzle 110 is mounted to the lower end 44A of plate section 49A of tire loading paddle 24A by insertion of outlet end 112 into a throughbore 126 of a clamp collar 128 mounted onto outwardly facing curved surface 54A so that the outlet end 112 of nozzle 110 projects outward from an opening 130 in the lower end 44A of plate section 49A. Note that the opening 130 is disposed to one side of longitudinal axis 134, see FIG. 12, through tire loading paddle 44A. The collar 124 is abutted against clamp collar 128 and secured therein by conventional means such as by a set screw (not shown).

Referring to FIGS. 13 and 14, orifice 114 of nozzle 110 is preferably constructed of a flat, narrow slot which angles along sidewalls 136 from an inner opening 138 to an outer opening 140 such that the inner opening is smaller than the outer opening.

The angle b from inner opening 138 to outer opening 140 is typically between about 80 degrees to about 120 degrees. Flat interior upper and lower walls 142A and 142B of orifice 114 are parallel and extend from inner opening 138 to outer opening 140 to form an angle c with respect to a first plane 144 through nozzle 110, which is typically between about 35 degrees and about 55 degrees and preferably about 45 degrees.

Figure 11:
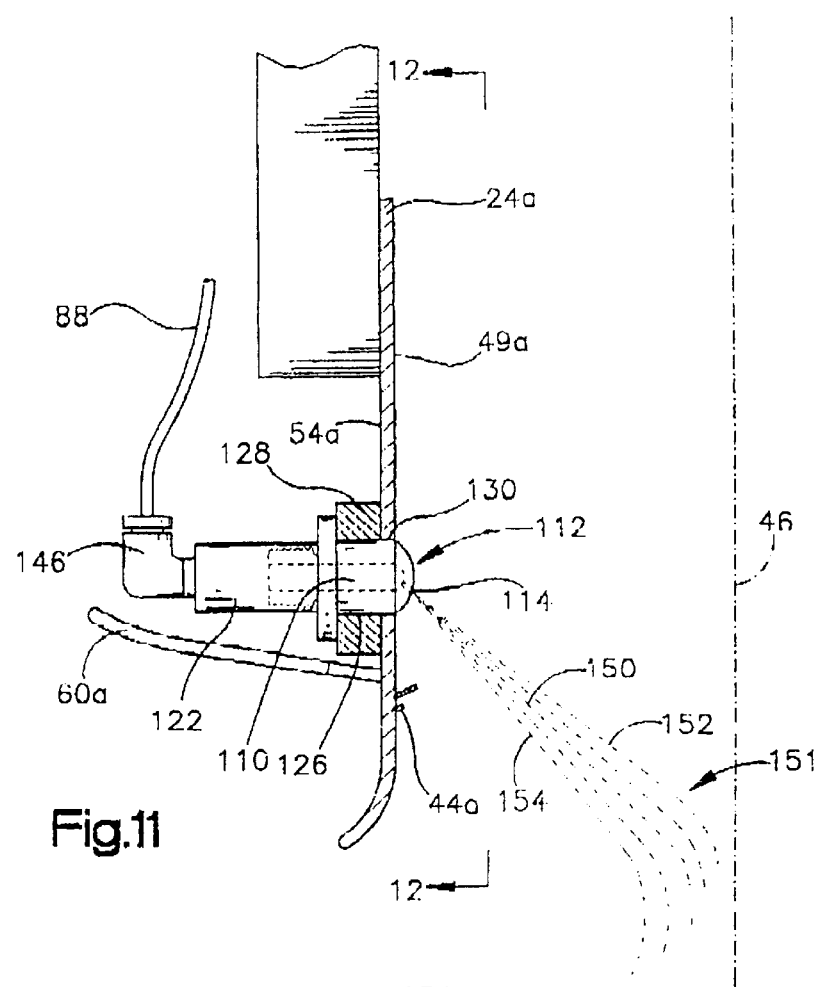
FIG. 11 is a side elevational view of a tire loading paddle of the tire loader incorporating a second alternative embodiment of the lubrication system.
Figure 12:
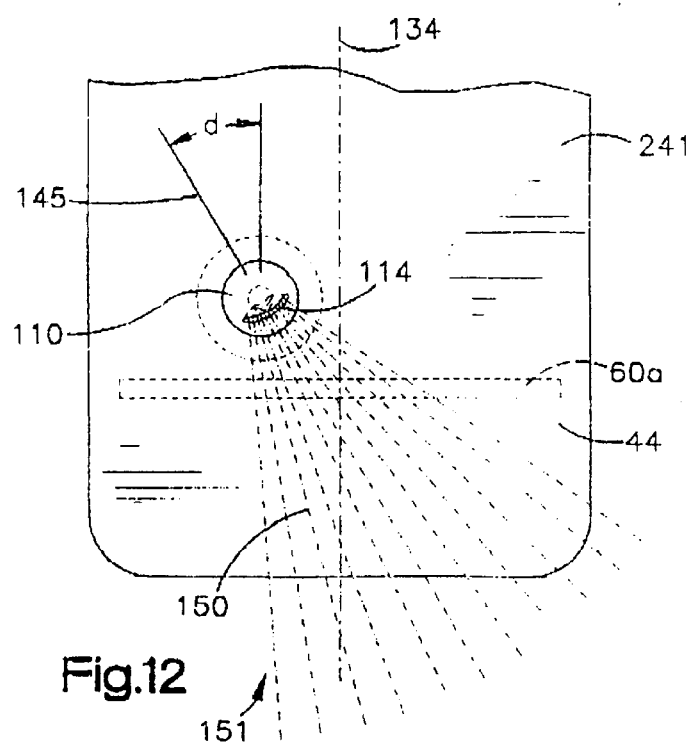
FIG. 12 is a view through line 12—12 of FIG. 11 showing a front view of the tire loading paddle of FIG. 11.

As shown in FIGS. 11 and 12, nozzle 110 is mounted to tire loading paddle 24A so that first plane 144 through nozzle 110 is disposed substantially perpendicular to the inwardly facing surface 52A of tire loading paddle 24A. Further, nozzle 110 is located to one side of axis 134 through the center of tire loading paddle 24A so that a second plane 145 through the center of nozzle 110, which is perpendicular to first plane 144 of nozzle 110 (see FIG. 13), is disposed at an angle "d" of about 10 degrees to about 50 degrees, and preferably at an angle of about 25 degrees to about 35 degrees, and most preferably at an angle of about 30 degrees with respect to axis 134. The spray cone 150 emitted from orifice 114 is directed downward across axis 134, as shown in FIG. 12, and toward centerline 46 through tire loader 24a, as shown in FIG. 11.

Figure 16:
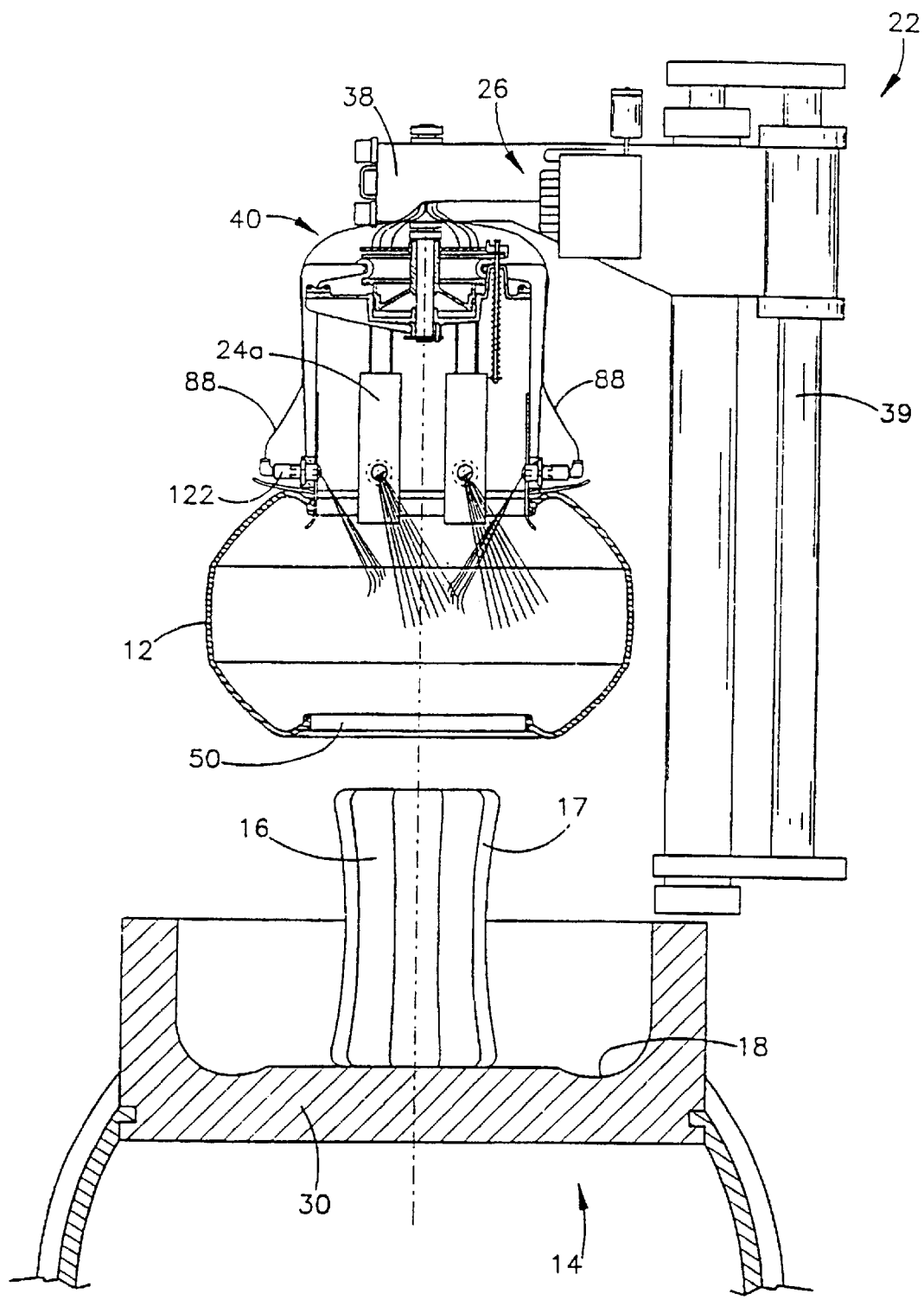
FIG. 16 is a side elevational view, partly in cross section, illustrating the additional pre-spray step of the alternative operation of the tire molding machine.

The lubricating system of the embodiment shown in FIG. 16, which includes the modification of the nozzle 110 shown in FIGS. 11–15, is essentially identical to that lubricating system 26 shown in FIG. 9 up to the flexible capillary tubes 88. While the flexible capillary tubes 88 are shown connected to individual pump units 68–82 in FIG. 8, in the alternative embodiment shown in FIGS. 11, 15, and 16, the other end of capillary tubes 88 are connected to one end of a coupler 146. The opposite end of coupler 146 is connected to pressure valve 122.

The principle feature of the alternative embodiment relates to the use and placement of divergent spray cone nozzle 110 on the plate section 49A of tire loading paddle 24A. Due to the shape and orientation of the orifice 114 of nozzle 110, a spray of bladder release exits orifice 114 in a relatively flat, divergent spray cone 150 and is directed downward and toward centerline 46 of tire loader 22. Additionally, the orientation and structure of nozzle 110, as discussed before, causes the spray cone 150 of bladder release to exit orifice 1.14 and cross longitudinal axis 134. As illustrated in FIGS. 11, 121 and 15, the orientation and structure of orifice 114 combined with the effect of the pressure on the upper surface 152 of the spray cone 150 being higher than the pressure on the undersurface 154 of the spray cone 150 and further combined with the effect or gravity creates a "curling effect" of the spray pattern 151 forming spray cone 150. That is, the spray cone 150 of bladder release from nozzle 110 is curled downward and toward one side of lower section 49A of tire loading paddles 24A. At the same time, the spray pattern has a tendency to swirl in the clockwise direction because of the orientation and structure of orifice 114 of nozzle 110. This spray pattern 151, when emitted from nozzles 110 mounted to each lower section 49A–49H of the loading paddles 24A–24H, has been found effective to substantially distribute the bladder release evenly on both the inflatable bladder and the interior surface of the green tire when sprayed in the confined space 25 therebetween. The swirling, curled spray pattern 151 emitted from each of the nozzles 110 is also effective for pre-spraying the inner surface of tire 12, as discussed below.

Another advantage of the nozzle 110 is that it is self cleaning. That is, nozzle 110 is mounted so that as the loading tire loading paddles 24A–24H are being withdrawn after the inflatable bladder 16 has already begun to inflate, the rubbing of the inflatable bladder against the opening 140 of orifice 114 cleans the opening 140 from residual bladder release.

Figure 4:
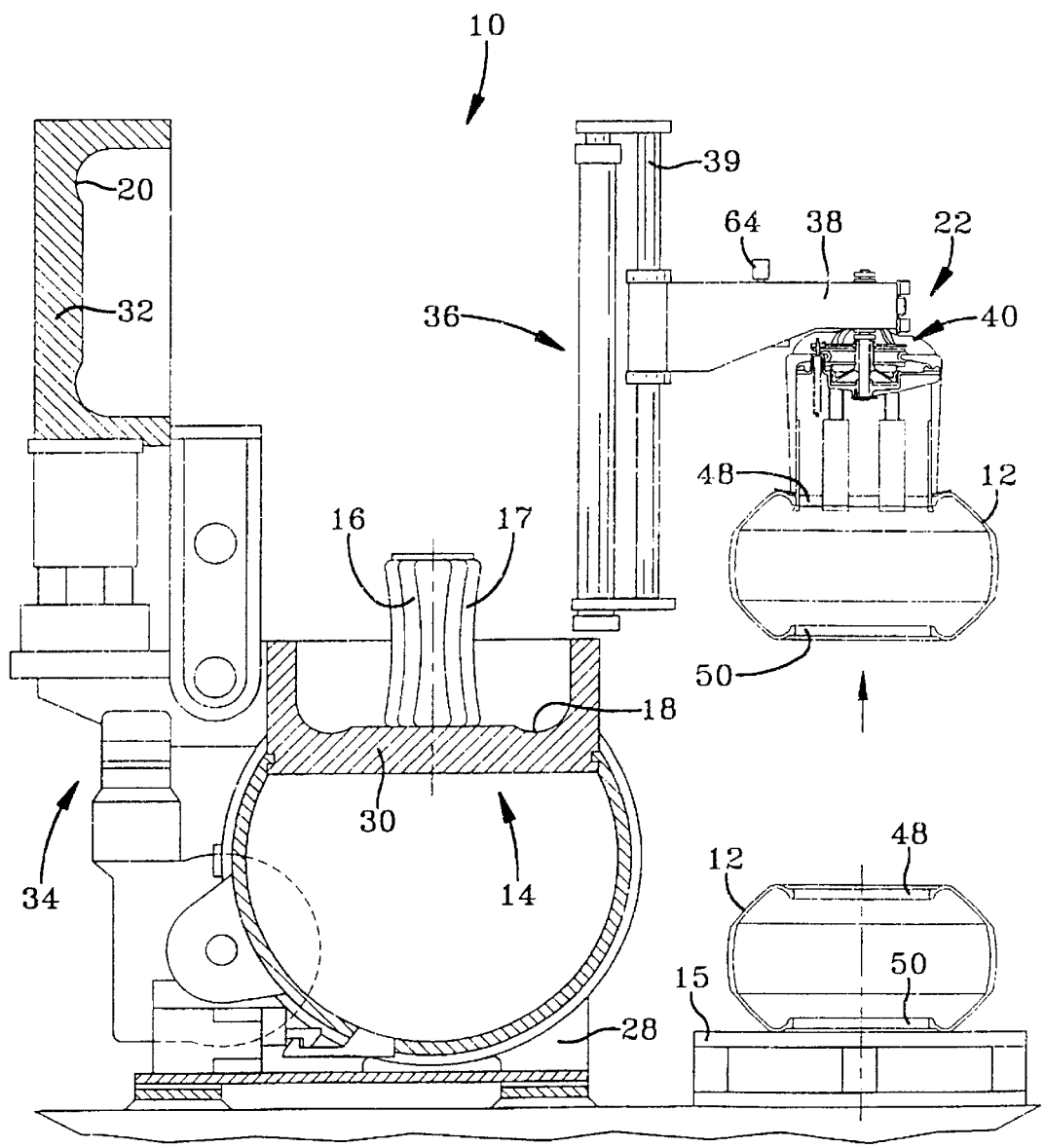
FIG. 4 is a side elevational view, partly in cross section, illustrating the tire molding machine of FIG. 1, and a green tire on a tire loader, prior to being loaded into the mold.
Figure 5:
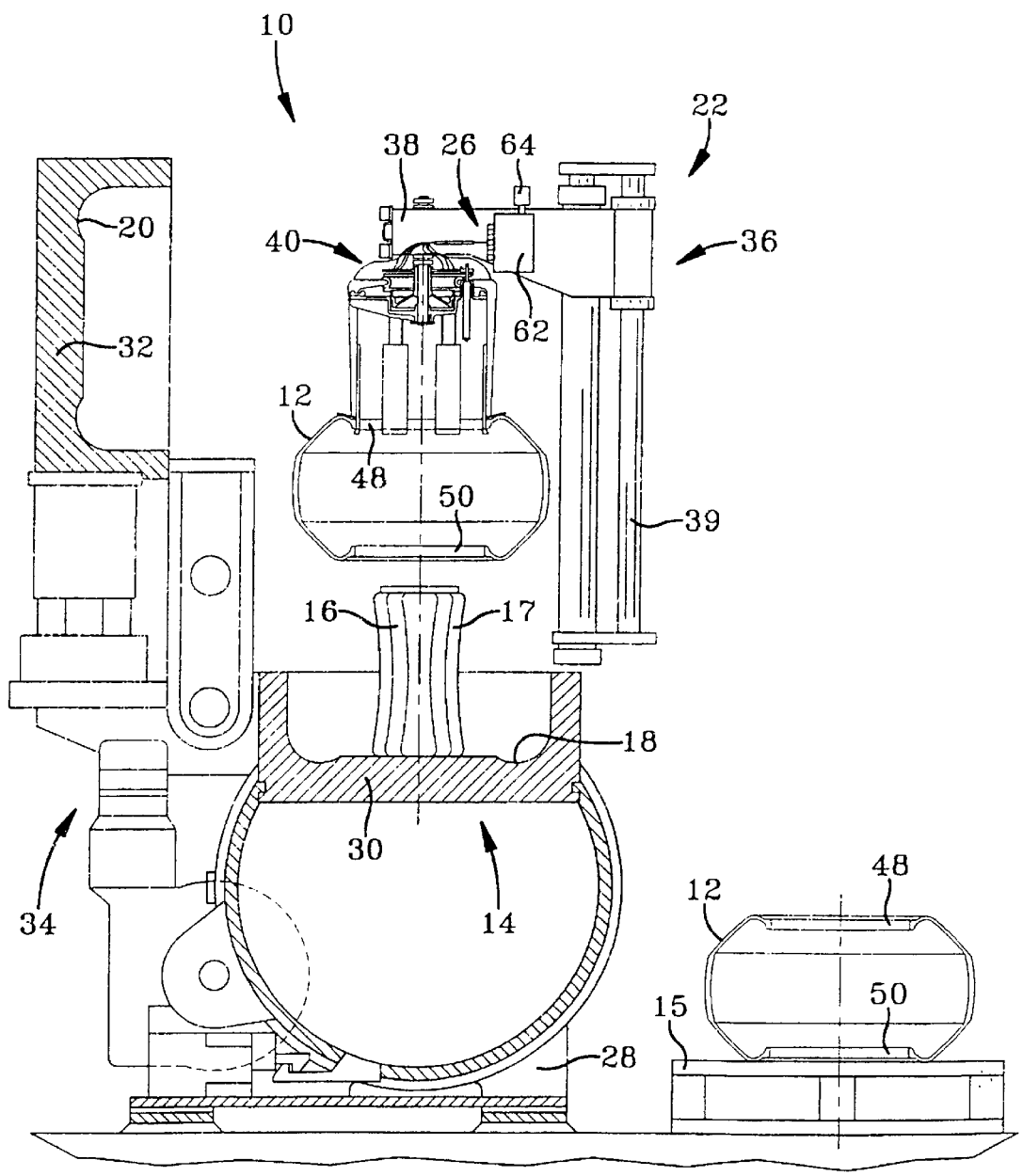
FIG. 5 is a side elevational view, partly in cross section, illustrating the tire molding machine of FIG. 1, with the green tire on a tire loader positioned directly above the inflatable bladder, just prior to being loaded into the mold.

Referring to FIG. 16, the alternative method of operation of the tire molding machine 10 involves the use a pre-spray step in the cycle of operation. In the alternative method of operation, the movable support structure 38 initially moves downward along rod 39, as shown and described with respect to the first embodiment, with the tire loading paddles 24A–24H in a contracted position so that the lower ends 44A–44H of the tire loading paddles 24A–24H can enter opening 48 of tire 12 resting on surface 15, as shown in FIG. 4, until the stop plates 60A–60H engage the upward facing side surface of the tire. Then, upper end sections 42A–42H are pivoted outward causing the radial distance of tire loading paddles 24A–24H from centerline 46 to increase, which causes the lower end sections 44A–44H to frictionally engage the surface of opening 48 of the tire 12. Next, the movable support structure 38 returns upward along rod 39 into the position shown in FIG. 4. Support structure 38 then rotates about rod 39 so that tire 12 is positioned above the bottom section 30 of mold 14 with the lower opening 50 through tire 12 directly above the collapsed, inflatable bladder 16. Then, bladder release is pre-sprayed onto the inner surface of tire 12, as shown in FIG. 16. The curling of the spray, as discussed before, insures that the pre-spray effectively covers the lower interior half and the lower bead about opening 50 of tire 12. During the pre-spraying step, the spray of bladder release does not go into the mold 14 because of the heated air, i.e. typically about 350° Fahrenheit, flowing upward from the mold. Next, support structure 38 begins to move downward so that the stop plates 60A–60H press against the upward facing wall of tire 12 and seat the bead formed about the tire opening 50 against the bottom section 30 of mold 14.

Simultaneously with the latter step, the lubricating system 26, is activated and a mist of bladder release is sprayed from each nozzle 110 against the outer facing surface 17 of the collapsed inflatable bladder 16. Typically, the space 25 confined between the inner surface of tire 12 and the outer surface 17 of inflatable bladder 16 is filled with the mist of bladder release. It is also within the terms of the invention to begin spraying the bladder release as the nozzles pass the inflatable bladder during the downward movement of the support 38 towards the mold 14. After the top section 32 of mold 14 begins to rotate and close against the bottom section 30 of mold 14, the tire loading paddles 24A–24H begin to retract towards the centerline 46 and move upward and away from the inner surface 18 of the bottom mold section 30. The support structure 38 continues to move upward until the tire loading paddles 24A–24H are free from opening 48 and above inflatable bladder 16 so that the top section 32 of mold 14 can close and seal mold 14 for the curing process.

In addition to the advantages over the prior art which were discussed with the description of the first method of operation, the alternative method of operation has a further benefit in that the inner surface of tire 12 is more completely coated during the curing process. The combination of the alternative embodiment utilizing the divergent spray cone nozzle 110 and the alternative method of operation, i.e., pre-spraying the interior of the tire, results in a complete coating of bladder release on both outward surface 17 of inflatable bladder 16 and the inner surface of tire 12.

It is apparent that there has been provided in accordance with this invention a system and method for applying a bladder release between a tire and an inflatable bladder in a tire molding machine which obviate the problems and limitations of the prior art systems. According to the invention, a mist of bladder release is automatically sprayed into the space between a tire and an inflatable bladder in a tire molding machine so that the bladder release covers the outer surface of the inflatable bladder and/or the inner surface of the green tire without getting onto the walls of the mold. In an alternative embodiment, the interior of the tire is pre-sprayed prior to entering the tire mold. Then, after the tire is moved into the tire mold with tire loading paddles, the space between the tire and the inflatable bladder is sprayed to insure that the bladder release covers both the outer surface of the inflatable bladder and/or the inner surface of the green tire.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

We claim:

1. A method of curing a green tire (12) in a tire molding machine (10) comprising:

loading said green tire (12) onto a tire loader (22);

positioning said green tire loaded on said tire loader relative to an inflatable bladder (16) disposed within a tire mold (14) of said tire molding machine; and moving said tire loader toward said tire mold to position said green tire about said inflatable bladder, the method characterized by:

pre-spraying a bladder release onto an interior surface of said tire prior to positioning said green tire within said tire mold; and spraying said bladder release into a confined space (25) between said green tire and said inflatable bladder (16).

2. The method of claim 1 wherein loading said green tire is characterized by loading said green tire (12) onto a plurality of tire loading paddles (24A–24H) of said tire loader (22).

3. The method of claim 2 further characterized by:

collapsing said plurality of tire loading paddles (24A–24H) towards a longitudinal centerline (46) extending through said tire loader (22) subsequent to said step of moving said tire loader toward said tire mold (14); and moving said tire loading paddles (24A–24H) away from said tire mold (14) while leaving said green tire (12) within said tire mold.

4. The method of claim 2 further characterized by the steps of:

pre-spraying said bladder release from a lubricating system (26) mounted on said tire loader through at least one nozzle (94, 110) mounted on each of said plurality of tire loading paddles (24A–24H); and spraying said bladder release through said at least one nozzle (94, 110) from each of said plurality of tire loading paddles.

5. The method of claim 4 further characterized by pre-spraying said bladder release through said at least one nozzle (94, 110) mounted on each of said plurality of tire loading paddles (24A–24H) onto a lower section of said interior surface of said green tire.

6. The method of claim 5 further characterized by spraying said bladder release through said at least one nozzle (94, 110) mounted on each of said plurality of tire loading paddles (24A–24H) directly onto said inflatable bladder (16).

7. The method of claim 2 wherein spraying a bladder release includes a lubricating system (26) for spraying a bladder release through at least one nozzle (94, 110) mounted to a lower section (49A–49H) of at a least one of said plurality of tire loading paddles (24A–24H), said at least one nozzle (49A–49H) having a slot shaped orifice formed of sidewalls disposed at an angle with respect to each other of between about 80 degrees to about 120 degrees.

8. The method of claim 7 further characterized by: providing each of said plurality of tire loading paddles with said at least one nozzle mounted thereto; and disposing each of said at least one nozzle with a first plane extending through the center thereof substantially perpendicular to an inwardly facing surface of the corresponding tire loading paddle to which it is mounted.

9. The method of claim 8 characterized by providing said slot shaped orifice (114) of each of said at least one nozzle (94, 110) with parallel interior walls which form an angle with said first plane of about 35 degrees to about 55 degrees.

10. The method of claim 8 characterized by providing said slot shaped orifice (114) of each of said at least one nozzle (94, 110) with parallel interior walls which form an angle with said first plane of about 45 degrees.

11. The method of claim 8 characterized by mounting each of said at least one nozzle (94, 110) to said tire loading paddles (24A–24H) so that a second plane through the center of each of said at least one nozzle and perpendicular to said first plane is disposed at an angle of between about 25 degrees to about 35 degrees with respect to said longitudinal axis extending through said corresponding tire loading paddle.

12. The method of claim 8 characterized by mounting each of said at least one nozzle to said tire loading paddles (24A–24H) so that a second plane through the center of each of said at least one nozzle and perpendicular to said first plane is disposed at an angle of about 30 degrees with respect to said longitudinal axis extending through said corresponding tire loading paddle.

13. in a tire molding machine (10) for curing a green tire (12) including a tire mold (14) having an inflatable bladder (16) therein for pressing said green tire against an inner surface of said tire mold and a tire loader (22) including a plurality of tire loading paddles (24A–24H) for loading said green tire into said tire mold (14) about said inflatable bladder, said tire loading paddles each having a longitudinal axis extending therethrough, an upper section for interconnecting said plurality of tire loading paddles to each other, and a lower section for mounting said green tire thereon, the improvement characterized by;

a lubricating system (26) for spraying a bladder release through at least one nozzle (110) mounted to said lower section (49A–49H) of at least one of said plurality of tire loading paddles, said at least one nozzle having a slot shaped orifice (114) formed of sidewalls disposed at an angle with respect to each other of between about 80 to about 120 degrees.

14. The system of claim 13 characterized by said sidewalls of said nozzle (110) being disposed at an angle with respect to each other of between about 90 to about 110 degrees.

15. The system of claim 13 characterized in that:

each of said plurality of tire loading paddles (24A–24H) has the at least one nozzle (110) mounted thereto; and each of said at least one nozzle (110) is disposed so that a first plane extending through the center thereof is substantially Perpendicular to an inwardly facing surface of the corresponding tire loading paddle to which it is mounted.

16. The system of claim 15 characterized in that each of said at least one nozzle (110) is mounted to said corresponding tire loading paddle (49A–49H) so that each of said at least one nozzle is located to one side of said longitudinal axis through the center of said corresponding tire loading paddle.

17. The system of claim 16 characterized in that each of said slot shaped orifices (114) of each of said at least one nozzle has parallel interior walls which form an angle with said first plane of about 35 degrees to about 55 degrees.

18. The system of claim 16 characterized in that each of said slot shaped orifices (114) of each of said at least one nozzle (110) has parallel interior walls which form an angle with said first plane of 45 degrees.

19. The system of claim 16 characterized in that each of said at least one nozzle (110) is mounted to said tire loading paddles (24A–24H) so that a second plane through the center of each of said at least one nozzle and perpendicular to said first plane is disposed at an angle of about 25 to 35 degrees with respect to said longitudinal axis extending through said corresponding tire loading paddle.

20. The system of claim 16 characterized in that each of said at least one nozzle (110) is mounted to said tire loading paddles (24A–24H) so that a second plane through the center of each of said at least one nozzle and perpendicular to said first plane is disposed at an angle of 30 degrees with respect to said longitudinal axis extending through said corresponding tire loading paddle.

* * * * *